United States Patent [19]

Yamada et al.

[11] Patent Number: 4,749,399
[45] Date of Patent: Jun. 7, 1988

[54] RING MOLD UNIT FOR SHAPING AND TEMPERING GLASS SHEET

[75] Inventors: Kazuo Yamada; Hideo Yoshizawa; Seiichiro Honjo, all of Osaka, Japan

[73] Assignee: Nippon Sheet Glass Co., Ltd., Osaka, Japan

[21] Appl. No.: 26,835

[22] Filed: Mar. 17, 1987

[30] Foreign Application Priority Data

Mar. 18, 1986 [JP] Japan .................. 61-39346[U]
Mar. 28, 1986 [JP] Japan .................. 61-45584[U]

[51] Int. Cl.$^4$ ............................................ C03B 23/03
[52] U.S. Cl. .................................. 65/273; 65/289; 65/348; 65/374.11
[58] Field of Search ............. 65/273, 289, 348, 374.11

[56] References Cited

U.S. PATENT DOCUMENTS

| | | | |
|---|---|---|---|
| 3,298,809 | 1/1967 | Barch et al. | 65/273 |
| 3,846,104 | 11/1974 | Seymour | 65/104 |
| 4,556,408 | 12/1985 | Fecik et al. | 65/289 |

Primary Examiner—Arthur Kellogg
Attorney, Agent, or Firm—Bogucki, Scherlacher, Mok & Roth

[57] ABSTRACT

A ring mold unit for shaping and tempering a glass sheet includes a shaping ring mold for bending a glass sheet heated to a temperature close to the softening point of glass, in association with upper and lower mold members, and a cooling ring mold for supporting the bent glass sheet while the glass sheet is being quenched and tempered by a cooling medium. The shaping ring mold has a thermally insulating member on its upper surface for supporting thereon, in surface-to-surface contact, the glass sheet inwardly of a peripheral edge thereof. The cooling ring mold is disposed outwardly of the shaping ring mold and having a shape complementary to the shape of the peripheral edge of the glass sheet for supporting the peripheral edge of the glass sheet. The cooling ring mold has recesses defined in the upper surface thereof, and is covered with a punched metal.

22 Claims, 6 Drawing Sheets

RING MOLD UNIT FOR SHAPING AND TEMPERING GLASS SHEET

BACKGROUND OF THE INVENTION

1. Field of the Invention

The present invention relates generally to an apparatus for shaping a curved tempered glass sheet for use as a front windshield for automobiles, for example, and more particularly to an improved ring mold unit for shaping and tempering a glass sheet in such an apparatus.

2. Description of the Relevant Art

Systems for shaping glass sheets for use as curved automotive window glass sheets, for example, operate by heating a flat glass sheet in a heating furnace up to the softening point of glass, feeding the heated glass sheet with a plurality of conveyor rollers in the heating furnace to a position in a shaping device, bending the glass sheet with upper and lower mold members in the shaping device, and then applying a suitable cooling medium to the curved glass sheet to temper the same. It has been customary to use a ring mold for supporting the peripheral edge of the glass sheet to bend the same with increased accuracy. When the bent glass sheet is quenched in the shaping device, the glass sheet is also supported by the ring mold. With the lower surface of the glass sheet being supported by the ring mold at the time of quenching the glass sheet, however, cooling air tends to remain undischarged between the glass sheet and the ring mold without sufficiently reaching the peripheral edge of the glass sheet, thus failing to temper the glass edge.

In view of the above shortcoming, there has been proposed a ring mold having a number of recesses defined in the upper surface thereof for allowing cooling air to be supplied in the vicinity of the peripheral edge of a glass sheet to be quenched. The proposed ring mold, however, raises another problem in that the recessed surface of the ring mold is apt to leave depressions and projections on the lower surface of the shaped glass sheet.

Japanese Laid-Open patent publication No. 57/145041 shows a ring mold unit comprising a cooling ring mold having a number of recesses and a shaping ring mold disposed outwardly of the cooling ring mold. After a glass sheet is bent by the shaping ring mold, cooling air is applied against the glass sheet while it is being supported by the cooling ring mold, thereby tempering the glass sheet. Since the shaping ring mold is constructed to support only the peripheral edge of the glass sheet, the surface area of the glass sheet which is supported by the shaping ring mold is relatively small, and hence mechanical distortions are liable to occur in the peripheral edge of the glass sheet. Moreover, the cooling mold leaves projections and depressions on the area of the glass sheet which is held by the cooling ring mold, and the peripheral edge of the glass sheet which is supported by the shaping ring mold cannot be well tempered inasmuch as the glass edge is not sufficiently cooled.

To eliminate the above drawbacks, there has been proposed a glass sheet shaping ring mold having a web of metallic woven cloth made of stainless steel fibers placed on the recessed surface of the ring mold which is disposed for contact with a glass sheet, as disclosed in Japanese Laid-Open patent publication No. 59/149934. The metallic woven cloth prevents the glass sheet from being held in direct contact with the ring mold that is held at a low temperature, and also prevents depressions and projections from being left on the glass sheet. However, cooling air is not well discharged from between the glass sheet and the ring mold, so that the glass sheet will not be tempered as well at the peripheral edge as at the other area thereof.

SUMMARY OF THE INVENTION

Therefore, it is an object of the present invention to provide a ring mold unit for shaping and tempering a glass sheet, the ring mold unit being capable of producing a glass sheet which is free of distortions tending to cause optical reflections and is of high shaping accuracy.

Another object of the present invention is to provide a ring mold unit for shaping and tempering a glass sheet uniformly in its entirety.

Still another object of the present invention is to provide a ring mold unit for shaping and tempering a glass sheet, the ring mold unit having a ring mold which can easily be changed in shape.

A further object of the present invention is to provide a ring mold unit for shaping and tempering a glass sheet without leaving depressions and projections on the surface of the glass sheet.

A still further object of the present invention is to provide a ring mold unit for shaping and tempering a glass sheet, the ring mold unit allowing cooling air to be well discharged.

According to the present invention, there is provided a ring mold unit for shaping and tempering a glass sheet, comprising a shaping ring mold for bending a glass sheet heated to a temperature close to the softening point of glass, in association with upper and lower mold members, and a cooling ring mold for supporting the bent glass sheet while the glass sheet is being quenched and tempered by a cooling medium, the shaping ring mold having a thermally insulating member on an upper surface thereof for supporting thereon, in surface-to-surface contact, the glass sheet inwardly of a peripheral edge thereof, the cooling ring mold being disposed outwardly of the shaping ring mold and having a shape complementary to the shape of the peripheral edge of the glass sheet for supporting the peripheral edge of the glass sheet.

The shaping ring mold comprises a lower layer of metal, an intermediate layer of resin fixed to an upper surface of the lower layer, and an upper layer of thermally insulating felt bonded to an upper surface of the intermediate layer and constituting the thermally insulating member.

The cooling ring mold has a number of recesses defined in an upper surface thereof. At least an upper surface of the cooling ring mold is covered with a punched metal strip having a number of openings.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
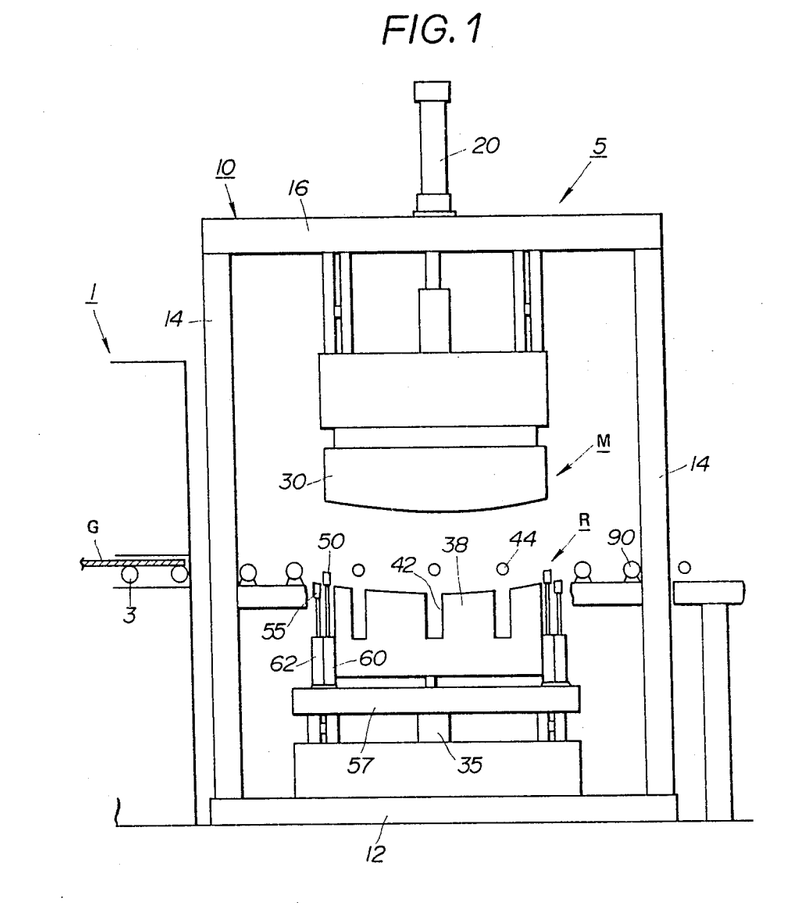
FIG. 1 is a schematic front elevational view of an apparatus for shaping a glass sheet, employing a ring mold unit for shaping and tempering a glass sheet according to the present invention.

As shown in FIG. 1, a glass sheet shaping system comprises a heating furnace 1 for heating a glass sheet G, which has been conveyed from a loading station (not shown), to a temperature close to the softening point of glass, and a shaping/cooling device 5 for bending and quenching the glass sheet G delivered by a plurality of conveyor rollers 3 in the heating furface 1 after the glass sheet G has been heated. The shaping/cooling device 5 has a supporting frame 10 which supports a mold generally denoted by the reference character M, the mold M having upper and lower mold members 30, 38. The supporting frame 10 comprises a base plate 12, a plurality of posts 14 erected on the base plate 12, and a top plate 16 fixed to and supported on the posts 14. A lifting/lowering unit 20 is disposed on the top plate 16 for lifting and lowering the upper mold member 30. The upper mold member 30 has a number of air jet holes (not shown) defined in its shaping surface, i.e., the lower surface, for ejecting cooling air. The upper mold member 30 is of a hollow construction with its interior space communicating with a source of pressurized air (not shown). Another lifting/lowering unit 35 is mounted on the base plate 12 for lifting and lowering the lower mold member 38. As better illustrated in FIG. 2, the lower mold member 38 has a number of air jet holes 40 defined in its upper surface for ejecting cooling air, and also has a number of elongate recesses or slots 42 in its upper surface for accommodating respective rollers 44 when the lower mold member 38 is elevated.

Figure 2:
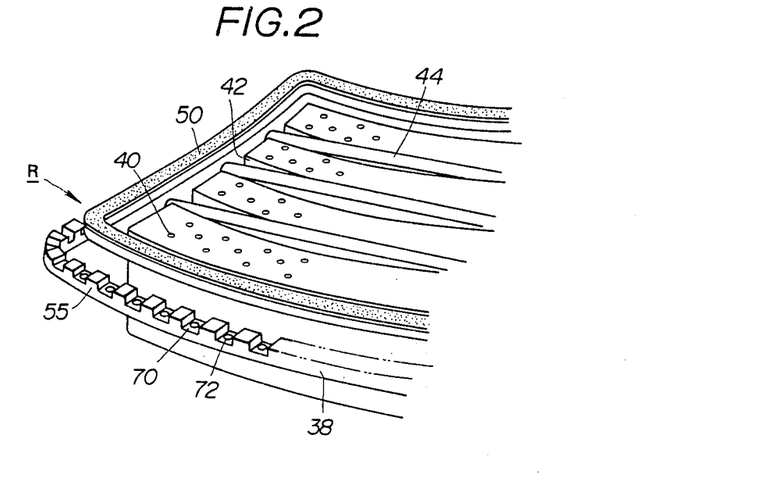
FIG. 2 is a fragmentary perspective view of the ring mold unit shown in FIG. 1 and a lower mold member of a shaping mold.

As shown in FIGS. 1 and 2, a ring mold unit R is disposed around or along the sides of the lower mold member 38. The ring mold unit R has an inner shaping ring mold 50 postioned closely to the lower mold member 38, and a cooling ring mold 55 disposed outwardly of the shaping ring mold 50. The shaping ring mold 50 and the cooling ring mold 55 can independently be lifted and lowered by respective lifting/lowering units 60, 62 disposed on a support table 57 mounted on the base plate 12.

Figure 3:
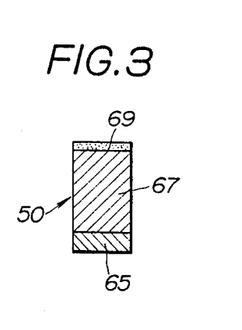
FIG. 3 is an enlarged cross-sectional view of a shaping ring mold of the ring mold unit.

As shown in FIG. 3, the shaping ring mold 50 is of a three-layer structure including a lower layer 65 made of metal such as stainless steel, an intermediate layer 67 of resin fixed to the upper surface of the lower layer 65, and an upper layer 69 made of a thermally insulating material such as thermally insulating felt bonded to the upper surface of the intermediate layer 67. The intermediate layer 67 serves to reduce a thermal effect which the lower layer 65 kept at a low temperature would have on the glass sheet G. The shaping ring mold 50 can easily be changed or modified in shape simply by cutting off the intermediate layer 67. The felt of the upper layer 69 prevents the glass sheet G from being thermally and mechanically distorted, and also prevents depressions and projections from being left on the surface of the glass sheet G, when the glass sheet G is shaped.

Figure 4:
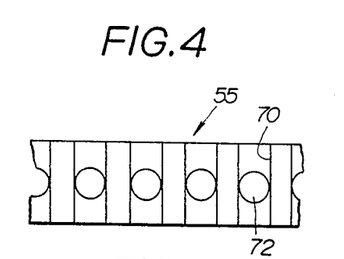
FIG. 4 is an enlarged fragmentary plan view of a cooling ring mold of the ring mold unit.
Figure 5:
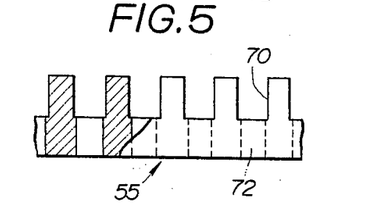
FIG. 5 is a fragmentary side elevational view, partly in cross section, of the cooling ring mold of FIG. 4.

As illustrated in FIG. 2, the cooling ring mold 55 has a shape complementary to the outer peripheral edge of the glass sheet G. As shown in detail in FIGS. 4 and 5, the cooling ring mold 55 has a plurality of recesses 70 defined at regular intervals in the upper surface thereof for allowing cooling air to be well discharged through the recesses 70. The cooling ring mold 55 also has vertical through holes 72 defined in the respective recesses 70 for assisting cooling air in getting discharged.

Figure 6:
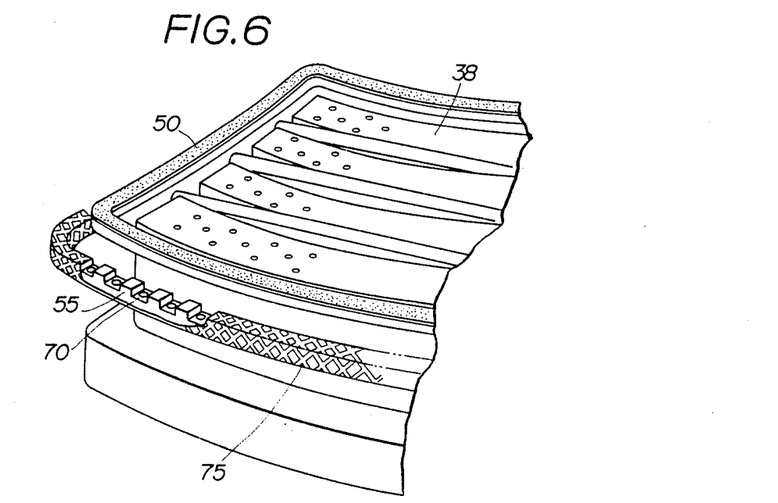
FIG. 6 is a view similar to FIG. 3, showing a punched or apertured metal strip fitted over the cooling ring mold of FIG. 4.
Figure 7:
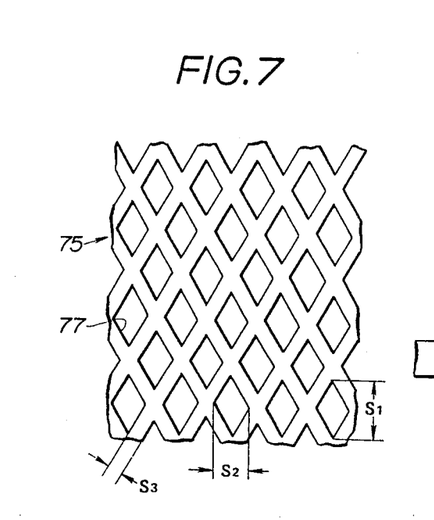
FIG. 7 is an enlarged fragmentary plan view of the punched metal strip shown in FIG. 6.
Figure 8:
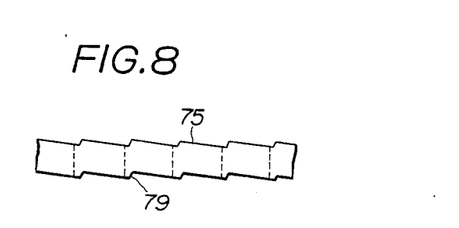
FIG. 8 is a fragementary side elevational view of the punched metal strip prior to being pressed by rolls.
Figure 9:
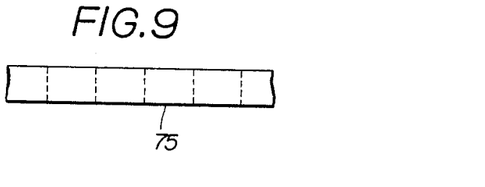
FIG. 9 is a fragementary side elevational view of the punched metal strip after being roll-pressed.

In an embodiment shown in FIG. 6, a punched or apertured metal strip 75, preferably made of stainless steel, is fitted over the entire surface of the cooling ring mold 55. As illustrated in FIG. 7, the punched metal strip 75 has a number of punched-out lozenge-shaped openings 77. If the size of each of the openings 77 were too large, the glass sheet G would tend to be brought into direct contact with the cooling ring mold 55. If the openings 77 were too small, then they would hinder the passage of cooling air as it is discharged. Preferably, the punched metal strip 76 has a thickness ranging from 0.1 to 0.5 mm, and the ratio of the area of the openings 77 to the entire area of the punched metal strip 75 is about 40% or more. Each of the lozenge-shaped openings 77 should preferably have a longer diagonal line of a length S1 ranging from 0.5 to 5.0 mm and a shorter diagonal line of a length S2 ranging from 0.4 to 2.0 mm, with the grid bars between adjacent openings having a width S3 ranging from about 0.1 to 1.5 mm. When a metal blank is punched to form the punched metal strip 75, the punched metal strip 75 has projections and depresssions 79 on its surfaces as shown in FIG. 8, and such an irregular surface would damage a glass sheet in contact therewith. After the punching, the punched metal strip 75 is pressed by rolls to flatten its surfaces as shown in FIG. 9.

Figure 10:
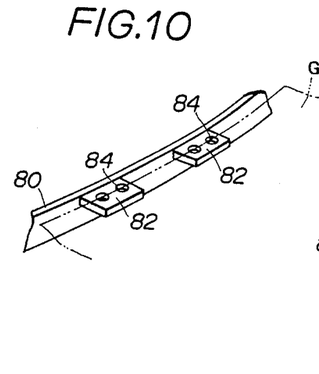
FIGS. 10 and 11 are fregmentary perspective views of cooling ring molds according to other embodiments of the present invention.
Figure 11:
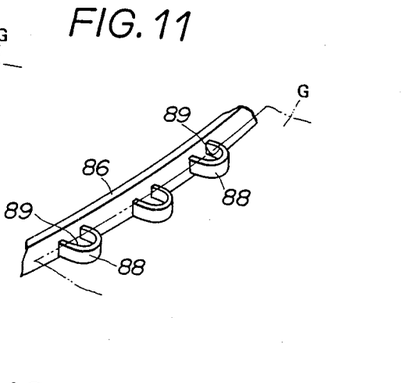

FIGS. 10 and 11 respectively show cooling ring molds according to other embodiments of the present invention. In the embodiment shown in FIG. 10, metal pieces 82 positioned at spaced intervals project from the inner side surface of a cooling ring mold 80. Each of the metal pieces 82 has one or more (two in the illustrated embodiment) holes 84 defined therein for discharging cooling air therethrough. In the embodiment of FIG. 11, substantially U-shaped metal pieces 88 spaced at intervals are joined to the inner side surface of a cooling ring mold 86. Each of the U-shaped metal pieces 88 defines an inner space 89 for discharging cooling air therethrough. It can easily be understood by those skilled in the art that the air-discharging spaces or holes 89 may be of any of various different shapes.

Figure 12:
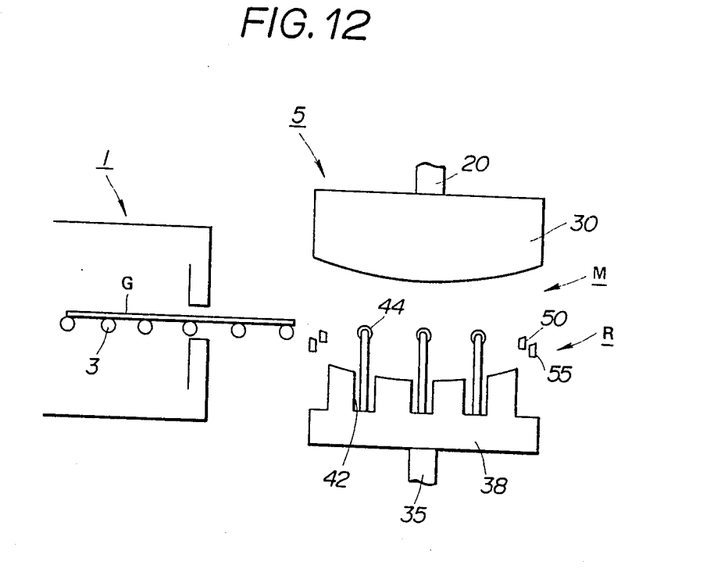
FIGS. 12 through 15 are schematic front elevational views showing progressive steps of forming a glass sheet.
Figure 13:
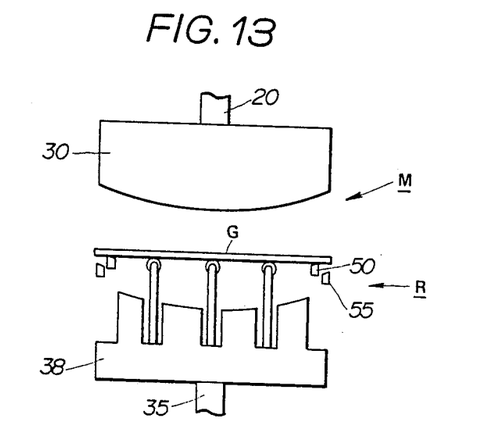
Figure 14:
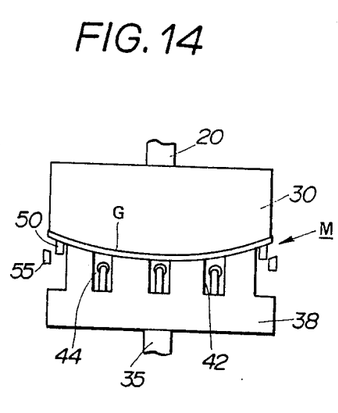

Operation of the glass sheet shaping system will be described below. As shown in FIG. 12, a glass sheet G that has been heated to a temperature close to the glass softening point is delivered by the conveyor rollers 3 onto the rollers 44 in the shaping device 5. At this time, the upper mold member 30 is in a lifted position, and the lower mold member 38 is in a lowered position. The shaping and cooling ring molds 50, 55 are positioned at a level lower than the rollers 44. Then, as illustrated in FIG. 13, the shaping ring mold 50 is elevated to receive the glass sheet G thereon. At this time, the cooling ring mold 55 is postiioned below the shaping ring mold 50. Instead of raising the shaping ring mold 50 to receive the glass sheet G, the rollers 44 may be lowered to place the glass sheet G on the shaping ring mold 50 which is now held in surface-to-surface contact with the glass sheet G. Thereafter, the lifting/lowering units 20, 35 are operated to lower the upper mold member 30 and lift the lower mold member 38. The glass sheet G is now bent by and between the upper and lower mold members 30, 38 while being supported by the shaping ring mold 50. The roller 44 is now fully accommodated in the respective recesses 42 of the lower mold member 38.

Figure 15:
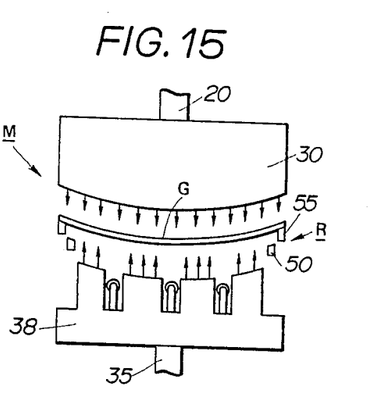

After the glass sheet G has been bent, the lifting/lowering units 20, 35 are actuated to elevate the upper mold member 30 and lower the lower mold member 38. The lifting/lowering units 60, 62 are also independently operated to lower the shaping ring mold 50 and raise the cooling ring mold 55 for thereby transferring the glass sheet G from the shaping ring mold 50 to the cooling ring mold 55. The peripheral edge of the glass sheet G is now supported by the cooling ring mold 55. Then, cooling air is ejected from the air jet holes of the upper mold member 30 and the air jet holes 40 of the lower mold member 38 toward the upper and lower surfaces of the glass sheet G, as shown in FIG. 15, thereby tempering the glass sheet G. Thereafter, the tempered curved glass sheet G is delivered by conveyor rollers 90 (FIG. 1) to a next processing station.

Figure 16:
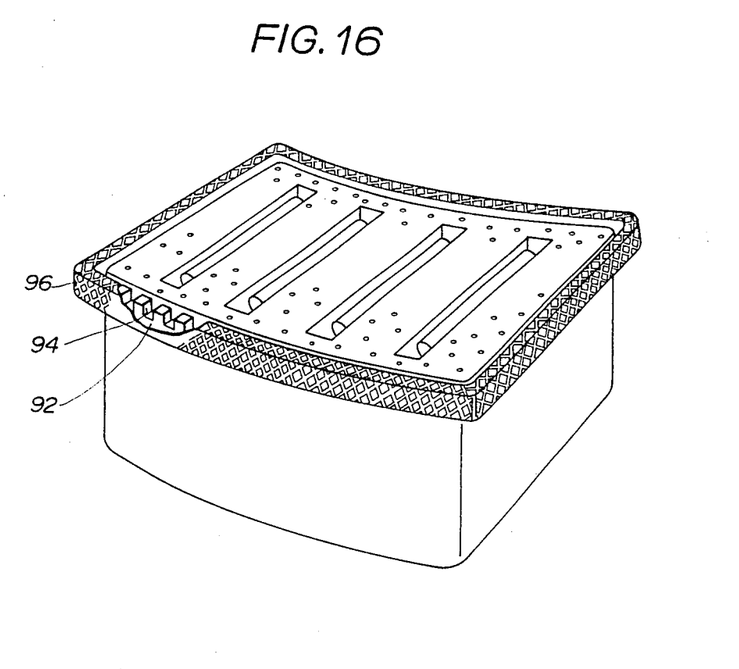
FIG. 16 is a perspective view of a shaping/cooling ring mold covered with a punched metal strip.

FIG. 16 shows a shaping/cooling ring mold 92 which serves as both shaping and cooling ring molds, the shaping/cooling ring mold 92 having a series of recesses 94 defined in its upper surface at regular intervals. The shaping/cooling ring mold 92 is entirely covered with a punched metal strip 96 which is identical to the punched metal strip 75 shown in FIG. 7, so that cooling air can well be discharged and the shaping/cooling ring 92 is held out of direct contact with a glass sheet to prevent depressions and projections from being left on the glass surface. If the size of each of the lozenge-shaped openings defined in the punched metal strip 96 were too large, the glass sheet would tend to contact the shaping/cooling ring mold 92, and if the lozenge-shaped openings were too small, they would not discharge cooling air well. Preferably, like the previous embodiment, the punched metal strip 96 has a thickness ranging from 0.1 to 0.5 mm, and the ratio of the area of the openings to the entire area of the punched metal strip 76 is about 40% or more. Each of the lozenge-shaped openings should preferably have a longer diagonal line of a length ranging from 0.5 to 5.0 mm and a shorter diagonal line of a length ranging from 0.4 to 2.0 mm, with the grid bars between adjacent openings having a width ranging from about 0.1 to 1.5 mm. After the punched metal strip 96 has been formed, it is pressed by rolls to flatten its surfaces. The shaping/cooling ring mold 92 operates in the same manner as both of the shaping and cooling ring molds 50, 55 of the previous embodiment.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A ring mold unit for shaping and tempering a glass sheet, comprising:
   a shaping ring mold for bending a glass sheet heated to a temperature close to the softening point of glass, in association with upper and lower mold members;
   a cooling ring mold for supporting the bent glass sheet while the glass sheet is being quenched and tempered by a cooling medium;
   said shaping ring mold having a thermally insulating member on an upper surface thereof for supporting thereon, in surface-to-surface contact, said glass sheet inwardly of a peripheral edge thereof; and
   said cooling ring mold being disposed outwardly of said shaping ring mold and having a shape complementary to the shape of the peripheral edge of said glass sheet for supporting said peripheral edge of the glass sheet.

2. A ring mold unit according to claim 1, wherein said shaping ring mold comprises a lower layer of metal, an intermediate layer of resin fixed to an upper surface of said lower layer, and an upper layer of thermally insulating felt bonded to an upper surface of said intermediate layer and constituting said thermally insulating member.

3. A ring mold unit according to claim 1, wherein said cooling ring mold has a number of recesses defined in an upper surface thereof.

4. A ring mold unit according to claim 3, wherein said recesses of the cooling ring mold are spaced at regular intervals.

5. A ring mold unit according to claim 3, wherein said cooling ring mold has a number of through holes defined respectively in said recesses.

6. A ring mold unit according to claim 3, further including a punched metal strip covering said cooling ring mold, said punched metal strip having a number of openings.

7. A ring mold unit according to claim 6, wherein said punched metal strip is roll-pressed.

8. A ring mold unit according to claim 7, wherein said punched metal strip has a thickness ranging from 0.1 to 0.5 mm.

9. A ring mold unit according to claim 8, wherein said openings of the punched metal strip are lozenge-shaped, and the ratio of the area of said openings to the entire area of the punched metal strip is about 40%, each of said lozenge-shaped openings having a longer diagonal line of a length ranging from 0.5 to 5.0 mm and a shorter diagonal line of a length ranging from 0.4 to 2.0 mm.

10. A ring mold unit according to claim 1, wherein said cooling ring mold has a plurality of metal pieces disposed on an inner side surface thereof, each of said metal pieces having at least one hole.

11. A ring mold unit according to claim 1, wherein said cooling ring mold has a plurality of substantially U-shaped metal pieces disposed on an inner side surface thereof.

12. A ring mold unit for shaping and tempering a glass sheet in a glass sheet shaping system having a supporting frame comprising a base plate, a plurality of posts erected on said base plate, and a top plate fixed to and supported on said posts, a first lifting/lowering unit mounted on said top plate, an upper mold member vertically movable by said first lifting/lowering unit, a second lifting/lowering unit mounted on said base plate, and a lower mold member vertically movable by said second lifting/lowering unit, said ring mold unit being mounted on said base plate, so that a glass sheet heated to a temperature close to the softening point of glass can be bent by said upper and lower mold members and quenched and tempered by a cooling medium applied from said upper and lower mold members, said ring mold unit comprising:
third and fourth lifting/lowering units mounted on said base plate;
a shaping ring mold vertically movable by said third lifting/lowering unit for bending the glass sheet heated to the temperature close to the softening point of glass, in association with said upper and lower mold members; and
a cooling ring mold vertically movable by said fourth lifting/lowering unit for supporting the bent glass sheet while the glass sheet is being quenched and tempered by the cooling medium,
said shaping ring mold having a thermally insulating member on an upper surface thereof for supporting thereon, in surface-to-surface contact, said glass sheet inwardly of a peripheral edge thereof; and
said cooling ring mold being disposed outwardly of said shaping ring mold and having a shape complementary to the shape of the peripheral edge of said glass sheet for supporting said peripheral edge of the glass sheet.

13. A ring mold unit according to claim 12, wherein said shaping ring mold comprises a lower layer of metal, an intermediate layer of resin fixed to an upper surface of said lower layer, and an upper layer of thermally insulating felt bonded to an upper surface of said intermediate layer and constituting said thermally insulating member.

14. A ring mold unit according to claim 12, wherein said cooling ring mold has a number of recesses defined in an upper surface thereof.

15. A ring mold unit according to claim 14, wherein said recesses of the cooling ring mold are spaced at regular intervals.

16. A ring mold unit according to claim 15, wherein said cooling ring mold has a number of through holes defined respectively in said recesses.

17. A ring mold unit according to claim 15, further including a punched metal strip covering said cooling ring mold, said punched metal strip having a number of openings.

18. A ring mold unit according to claim 17, wherein said punched metal strip is roll-pressed.

19. A ring mold unit according to claim 18, wherein said punched metal strip has a thickness ranging from 0.1 to 0.5 mm.

20. A ring mold unit according to claim 19, wherein said openings of the punched metal strip are lozenge-shaped, and the ratio of the area of said openings to the entire area of the punched metal strip is about 40%, each of said lozenge-shaped openings having a longer diagonal line of a length ranging from 0.5 to 5.0 mm and a shorter diagonal line of a length ranging from 0.4 to 2.0 mm.

21. A ring mold unit according to claim 12, wherein said cooling ring mold has a plurality of metal pieces disposed on an inner side surface thereof, each of said metal pieces having at least one hole.

22. A ring mold unit according to claim 12, wherein said cooling ring mold has a plurality of substantially U-shaped metal pieces disposed on an inner side surface thereof.

* * * * *